US008289695B2

(12) United States Patent  
Wu (10) Patent No.: US 8,289,695 B2
(45) Date of Patent: Oct. 16, 2012

(54) APPARATUS FOR MOUNTING DEVICE HAVING ELECTRICAL TERMINALS

(75) Inventor: Tsung Yin Wu, Taoyuan County (TW)

(73) Assignee: HannStar Display Corp., Taipei County (TW)

( * ) Notice: Subject to any disclaimer, the term of this patent is extended or adjusted under 35 U.S.C. 154(b) by 199 days.

(21) Appl. No.: 12/750,912

(22) Filed: Mar. 31, 2010

(65) Prior Publication Data

US 2011/0085295 A1    Apr. 14, 2011

(30) Foreign Application Priority Data

Oct. 13, 2009   (TW) .............................. 98218816 U (51) Int. Cl.
G06F 1/16 (2006.01)
H05K 5/00 (2006.01)
H05K 7/00 (2006.01)

(52) U.S. Cl. ........... 361/679.39; 361/679.33; 439/928.1; 439/946

(58) Field of Classification Search .................. 361/679.33–679.45; 439/157, 439/159, 160, 928.1, 946
See application file for complete search history.

(56) References Cited

U.S. PATENT DOCUMENTS

| | | | | | |
|---|---|---|---|---|---|
| 2,514,246 | A | * | 7/1950 | Knox | 361/727 |
| 3,836,938 | A | * | 9/1974 | Barrett et al. | 439/157 |
| 3,932,716 | A | * | 1/1976 | Mottel et al. | 200/50.02 |
| 4,083,616 | A | * | 4/1978 | McNiece et al. | 439/157 |
| 4,236,190 | A | * | 11/1980 | Hollingsead et al. | 361/725 |
| 4,453,754 | A | * | 6/1984 | Kelly | 294/15 |
| 4,875,873 | A | * | 10/1989 | Ishizuka et al. | 439/347 |
| 4,902,239 | A | * | 2/1990 | Schindler | 439/153 |
| 5,010,426 | A | * | 4/1991 | Krenz | 360/97.01 |
| 5,077,722 | A | * | 12/1991 | Geist et al. | 720/657 |
| 5,252,084 | A | * | 10/1993 | Wakata | 439/157 |
| 5,325,263 | A | * | 6/1994 | Singer et al. | 361/679.39 |
| 5,453,018 | A | * | 9/1995 | Ito et al. | 439/157 |
| 5,481,431 | A | * | 1/1996 | Siahpolo et al. | 361/679.31 |
| 5,588,728 | A | * | 12/1996 | Eldridge et al. | 312/332.1 |
| 5,595,492 | A | * | 1/1997 | Taguchi | 439/157 |
| 5,641,296 | A | * | 6/1997 | Larabell et al. | 439/342 |
| 5,721,669 | A | * | 2/1998 | Becker et al. | 361/679.31 |
| 5,828,546 | A | * | 10/1998 | Tirrell et al. | 361/679.39 |
| 5,947,572 | A | * | 9/1999 | Chang | 312/332.1 |
| 5,957,707 | A | * | 9/1999 | Kodama | 439/157 |
| 6,025,989 | A | * | 2/2000 | Ayd et al. | 361/695 |
| 6,118,668 | A | * | 9/2000 | Scholder et al. | 361/753 |
| 6,137,684 | A | * | 10/2000 | Ayd et al. | 361/727 |
| 6,532,150 | B2 | * | 3/2003 | Sivertsen et al. | 361/679.33 |
| 6,538,972 | B1 | * | 3/2003 | Poulsen | 720/638 |
| 6,544,061 | B1 | * | 4/2003 | Yasufuku et al. | 439/310 |
| 6,616,106 | B1 | * | 9/2003 | Dean et al. | 248/27.1 |
| 6,625,014 | B1 | * | 9/2003 | Tucker et al. | 361/679.34 |
| 6,816,367 | B2 | * | 11/2004 | Liu et al. | 361/679.33 |
| 7,027,309 | B2 | * | 4/2006 | Franz et al. | 361/798 |
| 7,175,470 | B2 | * | 2/2007 | Kangas | 439/483 |
| 7,400,936 | B2 | * | 7/2008 | Chang | 700/90 |

(Continued)

Primary Examiner — Adrian S Wilson (57) ABSTRACT

An apparatus for mounting a device having electrical terminals includes a bracket and a tray. The bracket has two first protruding portions and two pivoting mechanisms adapted to be connected to a base. The tray is positioned between the bracket and the base and adapted to carry the device having electrical terminals. The tray has a bottom surface and two first protrusions. When the bracket is pivotally connected to the base and when the bracket is rotated so that the first protruding portions slide on the first protrusions, the first protrusions are pushed to move toward the pivoting mechanisms and drive the bottom surface to move.

20 Claims, 6 Drawing Sheets

U.S. PATENT DOCUMENTS

| | | |
|---|---|---|
| 7,435,114 B2 * | 10/2008 | Desrosiers et al. ............ 439/157 |
| 7,465,175 B2 * | 12/2008 | Crippa et al. ................. 439/157 |
| 7,515,428 B2 * | 4/2009 | Tang ............................. 361/727 |
| 7,535,717 B2 * | 5/2009 | Lai et al. ........................ 361/727 |
| 7,568,925 B2 * | 8/2009 | Ciriello et al. ................ 439/157 |
| 7,736,168 B2 * | 6/2010 | Yeh et al. ...................... 439/331 |
| 7,771,218 B2 * | 8/2010 | Jaramillo et al. ............. 439/157 |
| 7,914,317 B2 * | 3/2011 | Pirillis .......................... 439/372 |
| 2005/0174743 A1 * | 8/2005 | Downing et al. ............. 361/725 |
| 2006/0133030 A1 * | 6/2006 | Takahashi et al. ............ 361/685 |
| 2006/0246766 A1 * | 11/2006 | Neer et al. .................... 439/372 |
| 2007/0019379 A1 * | 1/2007 | Hsiao ............................ 361/685 |
| 2007/0197075 A1 * | 8/2007 | Matsuo et al. ................ 439/266 |
| 2008/0019036 A1 * | 1/2008 | Chu et al. ................... 360/97.01 |
| 2008/0158810 A1 * | 7/2008 | Liu et al. ....................... 361/685 |
| 2008/0220641 A1 * | 9/2008 | Hsu et al. ...................... 439/266 |
| 2009/0152415 A1 * | 6/2009 | Yang et al. .................... 248/201 |
| 2010/0162561 A1 * | 7/2010 | Canham et al. ................. 29/831 |

* cited by examiner

APPARATUS FOR MOUNTING DEVICE HAVING ELECTRICAL TERMINALS

CROSS REFERENCE TO RELATED APPLICATION

This application claims the priority benefit of Taiwan Patent Application Serial Number 098218816 filed Oct. 13, 2009, the full disclosure of which is incorporated herein by reference.

BACKGROUND OF THE INVENTION

1. Field of the Invention

The invention relates to a mounting apparatus, and more particularly, to an apparatus for mounting a device having electrical terminals.

2. Description of the Related Art

In general, a hard disk is installed in a computer and has a size of 5.25, 3.5 or 2.5 inches. The 5.25-inch and 3.5-inch hard disks are commonly installed in desktop computers while 2.5-inch hard disks are usually installed in laptop computers.

In comparison with desktop computers, the connectors in a laptop computer for a hard disk are usually fixed because the available room in the computer is very small. Therefore, when a user desires to install a hard disk in a laptop computer, it is required to push the hard disk toward the fixed connectors in order to couple with each other. A pull at the hard disk can then separate it from the fixed connectors.

However, the fixed connectors are usually tightly coupled to the electrical terminals of the hard disk when the hard disk is electrically connected to the fixed connectors. Therefore, it is hard to separate the hard disk from the fixed connectors. To demount the hard disk from the computer, a large pull force is required to be exerted at the hard disk. This may cause the hard disk to collide with parts in the computer and therefore damage them when the pull force is not under control after the hard disk has been pulled out.

Accordingly, there exists a need to provide an apparatus for mounting a hard disk to solve the above-mentioned problems.

SUMMARY OF THE INVENTION

The present invention provides an apparatus for mounting a device having electrical terminals. The apparatus of the present invention can solve the prior art problem that a hard disk will collides with parts in the computer when the pull force does not stop after the hard disk has been pulled out.

In one embodiment, the apparatus of the present invention includes a bracket and a tray. The bracket has two opposing longitudinal side surfaces, two first protruding portions and two pivoting mechanisms. The first protruding portions are connected to the longitudinal side surfaces respectively. The pivoting mechanisms are connected to the longitudinal side surfaces of the bracket respectively and adapted to be connected to two longitudinal side surfaces of a base. The tray is positioned between the bracket and the base and adapted to carry a device having electrical terminals. The tray has a bottom surface and two first protrusions. The bottom surface has two opposing longitudinal side surfaces. The first protrusions are connected to the longitudinal side surfaces of the tray and positioned corresponding to the first protruding portions, respectively. When the bracket is pivotally connected to the longitudinal side surfaces of the base and when the bracket is pivotally rotated to let the first protruding portions slide on the first protrusions, the first protrusions are pushed to move toward the pivoting mechanisms and drives the bottom surface to move.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
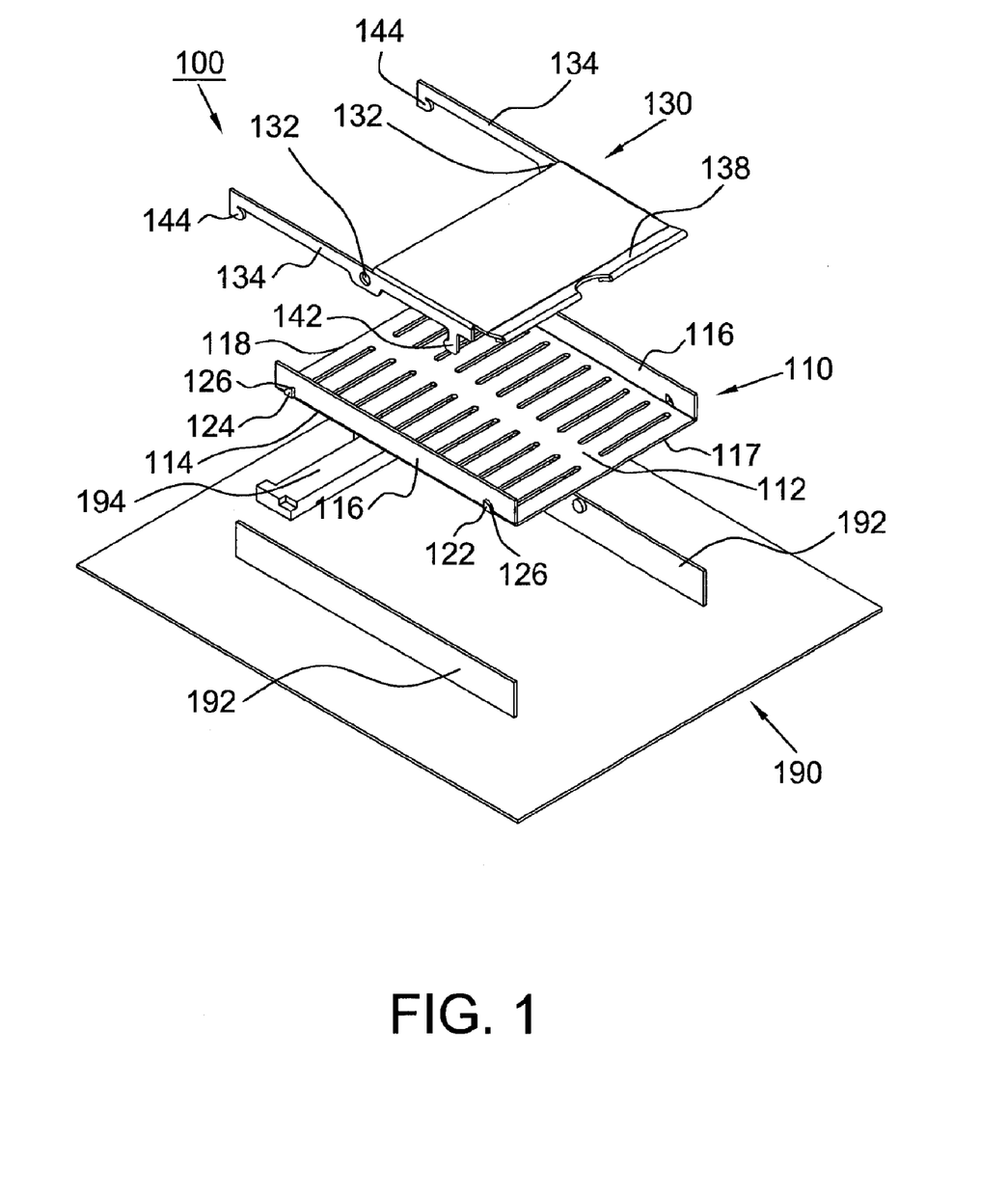
FIG. 1 is an exploded view of the apparatus for mounting a device having electrical terminals according to the present invention.

Referring to FIG. 1, the apparatus 100 for mounting a device having electrical terminals according to the present invention includes a tray 110 configured to carry a device having electrical terminals. The tray 110 has a bottom surface 112 and two opposing longitudinal side surfaces 116 extending upward from two opposing longitudinal sides 114 of the bottom surface 112, respectively. Therefore, the tray 110 is generally U-shaped. Protrusions 122, 124 are positioned on the two opposing longitudinal side surfaces 116 and adjacent to the bottom surface 112, wherein the protrusions 122 are adjacent to one transverse side 117 of the bottom surface 112 and the protrusions 124 are adjacent to the other transverse side 118 of the bottom surface 112. Each of the protrusions 122, 124 has an inclined arc plane 126 and these planes 126 are inclined down toward the neighboring transverse sides 117 or 118.

In addition, the apparatus 100 further includes a plastic bracket 130 that is pivotally connected to two longitudinal side surfaces 192 of a base 190 in a computer through pivoting mechanisms 132 on two longitudinal side surfaces 134 thereof. In the present invention, the base 190 can be a circuit board or the housing of the computer. The bracket 130 further has hooked protruding portions 142, 144 that are positioned on the two longitudinal side surfaces 134 and opposite to each other across the pivoting mechanisms 132. Moreover, the protruding portions 142, 144 are also positioned corresponding to the protrusions 122 and 124 on the tray 110, respectively.

Figure 2A:
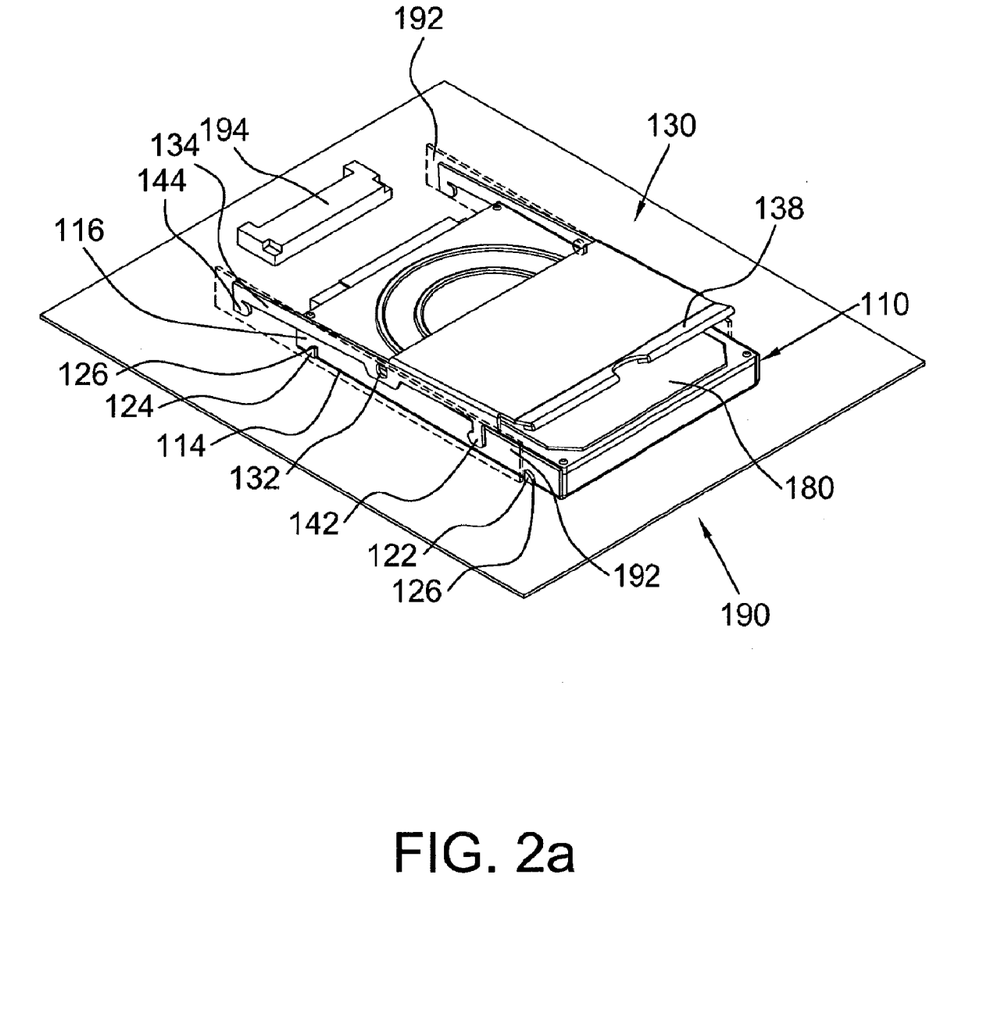
FIGS. 2a to 2c show the method of using the apparatus of the present invention to couple the carried device with an external electrical connector.
Figure 2B:
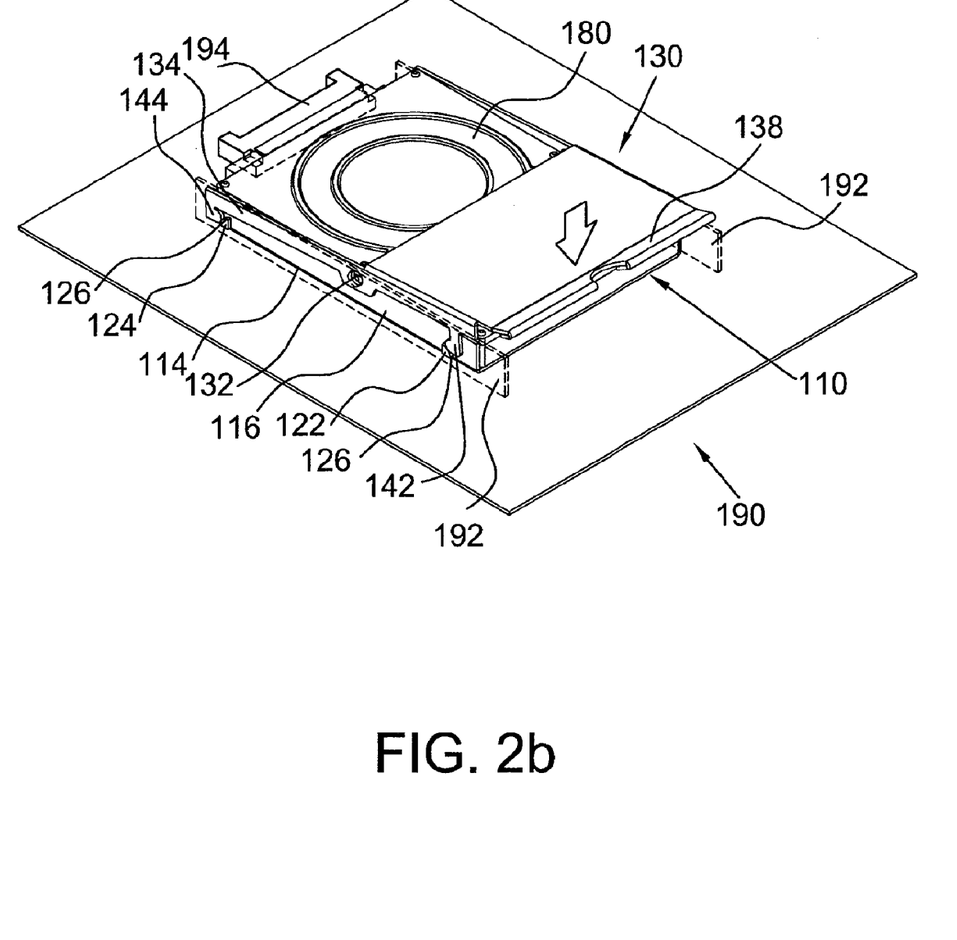
Figure 2C:
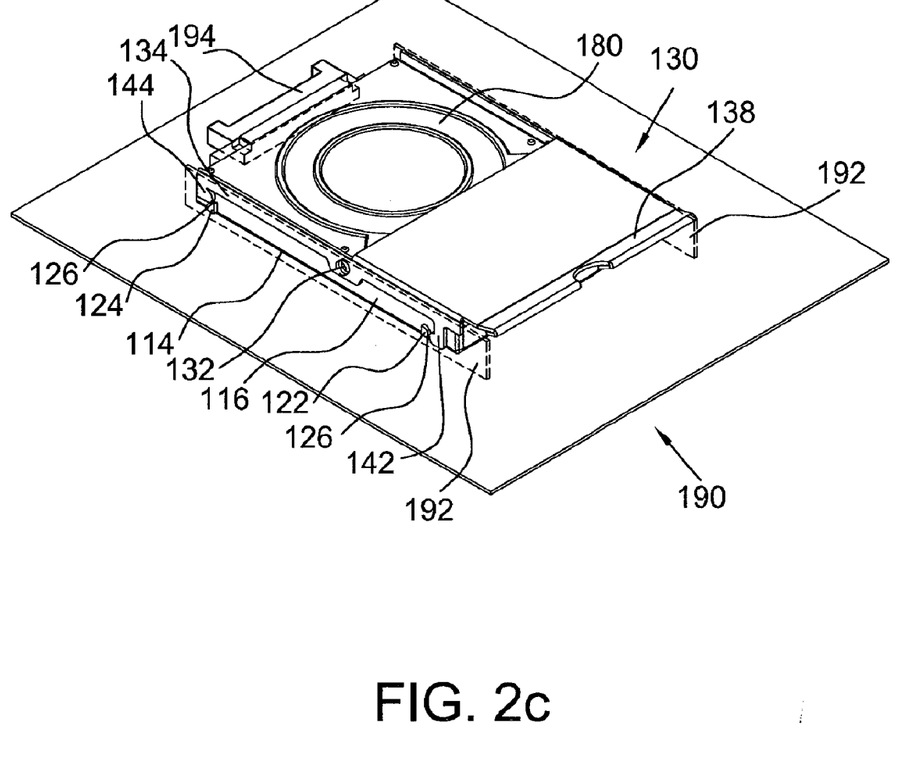

Referring to FIGS. 2a to 2c, when desiring to begin mounting a device having electrical terminals, such as a hard disk 180, the hard disk 180 is first fixed on the bottom surface 112 of the tray 110 by threading or hooking method with the electrical terminals thereof facing the rear end of the bracket 130. Afterward, a user can lift a handle 138 on the front end of the bracket 130 to move the protruding portions 142 upward. The tray 110, together with the hard disk 180 is placed under the bracket 130 and then pushed toward the rear end of the bracket 130 (see FIG. 2a). Subsequently, the handle 138 is pushed down the bracket 130 will therefore pivot clockwise. When the handle 138 is continued to be pushed down, the protruding portions 142 of the bracket 130 will be in contact with and slide downward along the inclined planes 126 of the protrusions 122. Since the inclined planes 126 of the protrusions 122 are inclined down toward the transverse side 117, the protruding portions 142 will push the protrusions 122 to move backward and toward the pivoting mechanisms 132. Consequently, the tray 110 will be driven to move backward accordingly. In this meantime the protruding portions 144 on the rear end of the tray 110 will move upward. Since the tray 110 is pushed to move backward, the protruding portions 144 will slide upward along the inclined planes 126 of the protrusions 124 (see FIG. 2b). When the handle 138 is continued to be pushed down, the protruding portions 142 will slide down to the lower end of the inclined planes 126 of the protrusions 122 and the protruding portions 144 will slide up to the upper end of the inclined planes 126 of the protrusions 124. At this moment the tray 110 will be pushed to be in position (see FIG. 2c).

During the backward movement of the tray 110, the electrical terminals of the hard disk 180 will gradually move toward the corresponding electrical connector 194 in rear of the tray 110. When the tray 110 is moved to be in position, the electrical terminals of the hard disk 180 will be coupled with the corresponding electrical connector 194 so that the hard disk 180 is electrically connected to the computer.

Figure 3A:
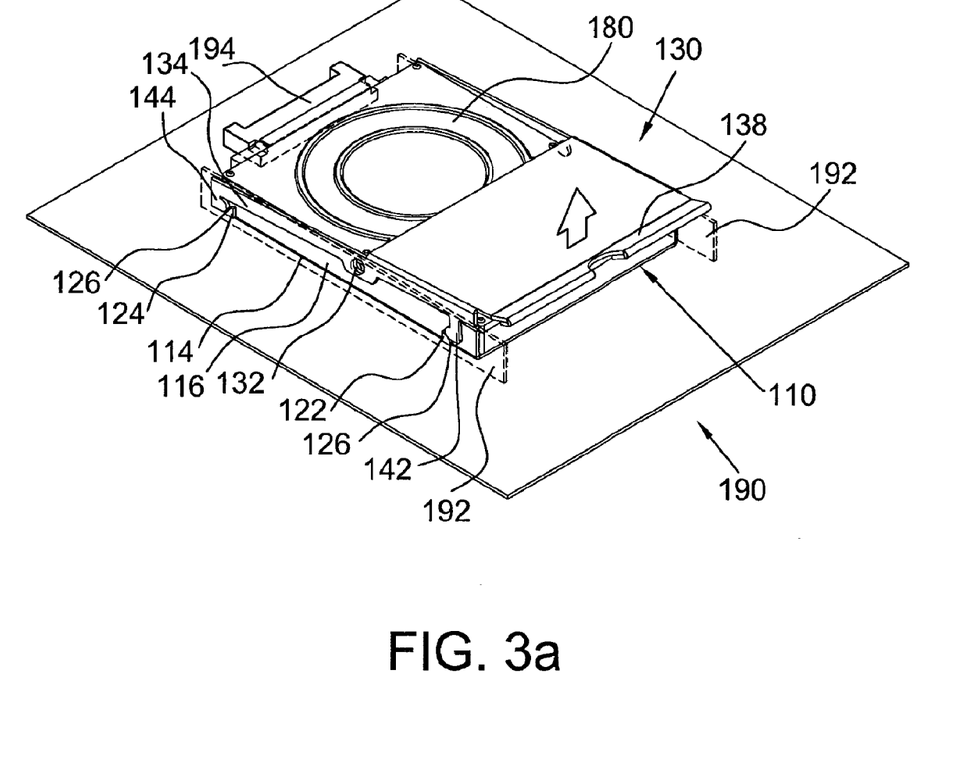
FIGS. 3a to 3b show the method of using the apparatus of the present invention to separate the carried device from the external electrical connector.
Figure 3B:
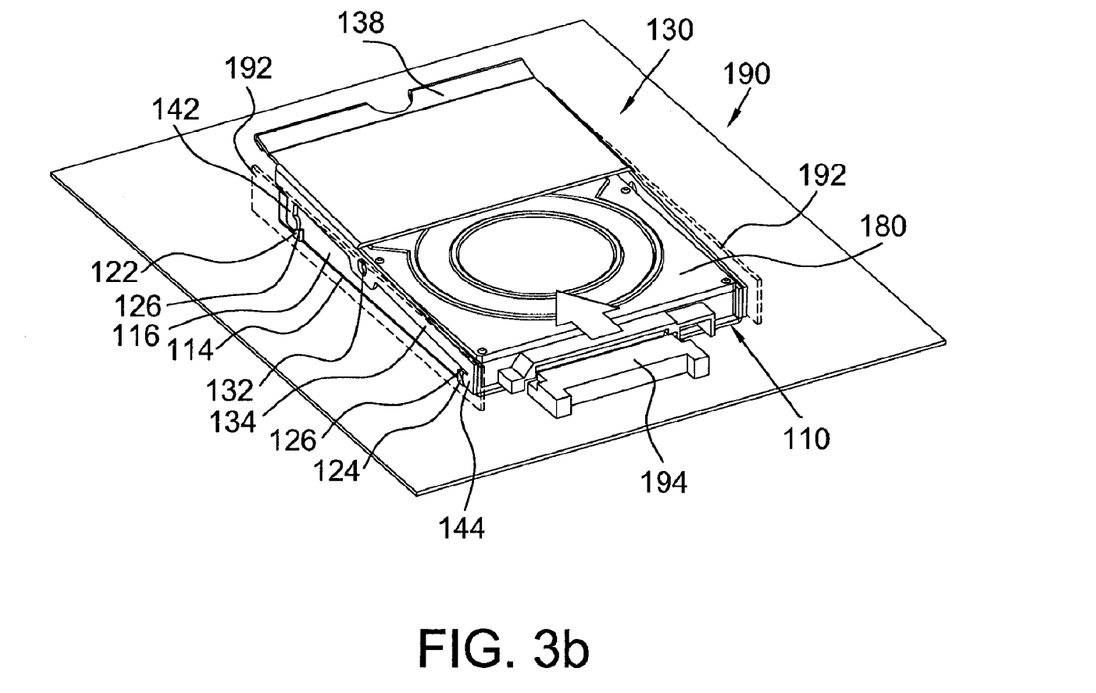

Referring to FIGS. 3a to 3b, when desiring to demount the hard disk 180 from the computer, a user can lift the handle 138 to let the bracket 130 pivoted counterclockwise. At this moment the protruding portions 144 on the rear end of the tray 110 will slide downward along the inclined planes 126 of the protrusions 124 to push the protrusions 124 to move forward and toward the pivoting mechanisms 132. In this way the tray 110 will be driven to move forward to pull the electrical terminals of the hard disk 180 out of the electrical connector 194 (see FIG. 3a). When the handle 138 is continued to be pulled up, the protruding portions 144 will continuously exert a forward force on the tray 110. Finally, the hard disk 180 will be completely separated from the electrical connector 194 (see FIG. 3b).

According to the apparatus of the present invention, a user can mount or demount a hard disk by simply rotating the handle on the bracket. There is no any need to use a screwdriver. Most importantly, the apparatus of the present invention can solve the prior art problem that a hard disk will collide with parts in the computer when the pull force is not under control after the hard disk has been pulled out.

It should be appreciated that although the device having electrical terminals described in the embodiments of the present invention is a hard disk, the apparatus of the present invention can also be used to mount other devices, such as a CD-ROM drive or simply an electrical connector.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for mounting a device having an electrical terminal, the apparatus comprising:
    a base having two longitudinal side surfaces;
    a bracket having two opposing longitudinal side surfaces, two first protruding portions, and two pivoting mechanisms, the first protruding portions being connected to the longitudinal side surfaces of the bracket, respectively, the pivoting mechanisms being connected to the longitudinal side surfaces of the bracket, respectively, and adapted to be connected to the two longitudinal side surfaces provided on the base, respectively; and
    a U-shaped tray positioned between the bracket and the base, and adapted to carry the device, the tray having a bottom surface, two opposing longitudinal side surfaces connected to the bottom surface, and two first protrusions, the first protrusions being connected to the longitudinal side surfaces of the tray, respectively, and positioned corresponding to the first protruding portions of the bracket, respectively, wherein
    the tray is opened upwardly and free of a top surface, and
    when the bracket is pivotally connected to the longitudinal side surfaces of the base and when the bracket is pivotally rotated to permit the first protruding portions of the bracket to slide on the first protrusions of the tray, the first protrusions of the tray are pushed to move in a first direction to drive the tray to move in the first direction.

2. The apparatus as claimed in claim 1, wherein each of the first protrusions of the tray has an inclined plane, along which a corresponding one of the first protruding portions of the bracket is slidable downward.

3. The apparatus as claimed in claim 2, wherein the inclined planes of the first protrusions of the bracket are arc shaped.

4. The apparatus as claimed in claim 1, wherein the bracket further has a handle formed on a side where the first protruding portions provided, for lifting up or down the bracket with respect to the pivoting mechanisms thus pivoting the bracket.

5. The apparatus as claimed in claim 1, wherein
    the bracket further has two second protruding portions connected to the longitudinal side surfaces of the bracket, respectively, and positioned on a side opposite to the first protruding portions across the pivoting mechanisms, respectively,
    the tray further has two second protrusions connected to the longitudinal side surfaces thereof and positioned corresponding to the second protruding portions of the bracket, respectively, and
    when the bracket is pivotally connected to the longitudinal side surfaces of the base and when the bracket is pivotally rotated to permit the second protruding portions of the bracket to slide on the second protrusions of the tray, the second protrusions of the tray are pushed to move in a second direction opposite to the first direction to drive the tray to move in the second direction.

6. The apparatus as claimed in claim 5, wherein each of the second protrusions of the tray has an inclined plane, along which a corresponding one of the second protruding portions of the bracket is slidable downward.

7. The apparatus as claimed in claim 6, wherein the inclined planes of the first protrusions of the bracket are arc shaped.

8. The apparatus as claimed in claim 1, wherein the device is a hard disk.

9. The apparatus as claimed in claim 1, wherein the device is a CD-ROM drive.

10. The apparatus as claimed in claim 1, wherein the base is a circuit board of a host device in which the apparatus is mounted.

11. The apparatus as claimed in claim 5, wherein the base is a housing of a host device in which the apparatus is mounted.

12. An apparatus for mounting a device having an electrical terminal, the apparatus comprising:
    a base having two longitudinal side surfaces;
    a bracket having two opposing longitudinal side surfaces, two first protruding portions, and two pivoting mechanisms, the first protruding portions being connected to the longitudinal side surfaces of the bracket, respectively, the pivoting mechanisms being connected to the longitudinal side surfaces of the bracket, respectively, and adapted to be connected to the two longitudinal side surfaces provided on the base, respectively; and a tray positioned between the bracket and the base, and adapted to carry the device, the tray having a bottom surface, two opposing longitudinal side surfaces connected to the bottom surface, and two first protrusions, the first protrusions being connected to the longitudinal side surfaces of the tray, respectively, and positioned corresponding to the first protruding portions of the bracket, respectively, wherein the bottom surface of the tray has a plurality of openings formed thereon, and when the bracket is pivotally connected to the longitudinal side surfaces of the base and when the bracket is pivotally rotated to permit the first protruding portions of the bracket to slide on the first protrusions of the tray, the first protrusions of the tray are pushed to move in a first direction to drive the tray to move in the first direction.

13. The apparatus as claimed in claim 12, wherein each of the first protrusions of the tray has an inclined plane, along which a corresponding one of the first protruding portions of the bracket is slidable downward.

14. The apparatus as claimed in claim 12, wherein the bracket further has two second protruding portions connected to the longitudinal side surfaces of the bracket, respectively, and positioned on a side opposite to the first protruding portions across the pivoting mechanisms, respectively, the tray further has two second protrusions connected to the longitudinal side surfaces thereof and positioned corresponding to the second protruding portions of the bracket, respectively, and when the bracket is pivotally connected to the longitudinal side surfaces of the base and when the bracket is pivotally rotated to permit the second protruding portions of the bracket to slide on the second protrusions of the tray, the second protrusions of the tray are pushed to move in a second direction opposite to the first direction to drive the tray to move in the second direction.

15. The apparatus as claimed in claim 14, wherein each of the second protrusions of the tray has an inclined plane, along which a corresponding one of the second protruding portions of the bracket is slidable downward.

16. An apparatus for mounting a device having an electrical terminal, the apparatus comprising:

a base having two longitudinal side surfaces;

a bracket having two opposing longitudinal side surfaces, two first protruding portions, and two pivoting mechanisms, the first protruding portions being connected to the longitudinal side surfaces of the bracket, respectively, the pivoting mechanisms being connected to the longitudinal side surfaces of the bracket, respectively, and adapted to be connected to the two longitudinal side surfaces provided on the base, respectively; and a tray positioned between the bracket and the base, and adapted to carry the device, the tray having a bottom surface, two opposing longitudinal side surfaces connected to the bottom surface, and two first protrusions, the first protrusions being connected to the longitudinal side surfaces of the tray, respectively, and positioned corresponding to the first protruding portions of the bracket, respectively, wherein the bottom surface is in sliding contact with the base, and when the bracket is pivotally connected to the longitudinal side surfaces of the base and when the bracket is pivotally rotated to permit the first protruding portions of the bracket to slide on the first protrusions of the tray, the first protrusions of the tray are pushed to move in a first direction to drive the tray to move in the first direction.

17. The apparatus as claimed in claim 16, wherein each of the first protrusions of the tray has an inclined plane, along which a corresponding one of the first protruding portions of the bracket is slidable downward.

18. The apparatus as claimed in claim 16, wherein the bracket further has two second protruding portions connected to the longitudinal side surfaces of the bracket, respectively, and positioned on a side opposite to the first protruding portions across the pivoting mechanisms, respectively, the tray further has two second protrusions connected to the longitudinal side surfaces thereof and positioned corresponding to the second protruding portions of the bracket, respectively, and when the bracket is pivotally connected to the longitudinal side surfaces of the base and when the bracket is pivotally rotated to permit the second protruding portions of the bracket to slide on the second protrusions of the tray, the second protrusions of the tray are pushed to move in a second direction opposite to the first direction to drive the tray to move in the second direction.

19. The apparatus as claimed in claim 18, wherein each of the second protrusions of the tray has an inclined plane, along which a corresponding one of the second protruding portions of the bracket is slidable downward.

20. An apparatus for mounting a device having an electrical terminal, the apparatus comprising:

a base having two longitudinal side surfaces;

a tray having a bottom surface, two opposing longitudinal side surfaces extending upward from two opposing longitudinal sides of the bottom surface, respectively, two first protrusions positioned on first end portions of the two opposing longitudinal side surfaces, respectively, and two second protrusions positioned on second end portions of the two opposing longitudinal side surfaces, respectively, each of the first and second protrusions having an inclined arc plane inclined downward;

a bracket having two opposing longitudinal side surfaces, two first protruding portions positioned on first end portions of the two opposing longitudinal side surfaces of the bracket, respectively, two second protruding portions positioned on second end portions of the two opposing longitudinal side surface of the bracket, respectively, and two pivoting mechanisms positioned between the first protruding portions and the second protruding portions and connected to the longitudinal side surfaces of the bracket, respectively, the pivoting mechanisms being coupled to the two longitudinal side surfaces of the base, wherein the bracket is pivotally rotatable to permit the first protruding portions of the bracket to slide on the first protrusions of the tray, and the first protrusions of the tray are adapted to be pushed by the first protruding portions to move in a first direction and to drive the tray to move in the first direction, and the bracket is pivotally rotatable to permit the second protruding portions of the bracket to slide on the second protrusions of the tray, and the second protrusions of the tray are adapted to be pushed by the second protruding portions to move in a second direction opposite to the first direction and to drive the tray to move in the second direction.

* * * * *